(12) United States Patent
Varma et al.

(10) Patent No.: US 11,797,484 B2
(45) Date of Patent: Oct. 24, 2023

(54) TRANSIENT CACHING TO SUPPORT SHORT-TERM RECALL OF TIERED FILES

(71) Applicant: EMC IP Holding Company LLC, Hopkinton, MA (US)

(72) Inventors: Mithun Mahendra Varma, Bangalore (IN); Rabi Shankar Shaw, Bangalore (IN); Srikantha Kalaghatta, Bangalore (IN); Sarat Kumar Behera, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 318 days.

(21) Appl. No.: 17/378,930

(22) Filed: Jul. 19, 2021

(65) Prior Publication Data
US 2022/0391352 A1 Dec. 8, 2022

(30) Foreign Application Priority Data
Jun. 4, 2021 (IN) .............................. 202141024906

(51) Int. Cl.
*G06F 16/172* (2019.01)
*G06F 16/13* (2019.01)
*G06F 16/17* (2019.01)
*G06F 16/182* (2019.01)

(52) U.S. Cl.
CPC ............ *G06F 16/172* (2019.01); *G06F 16/13* (2019.01); *G06F 16/1727* (2019.01); *G06F 16/183* (2019.01)

(58) Field of Classification Search
CPC ...... G06F 16/172; G06F 16/183; G06F 16/11; G06F 16/13; G06F 16/1727

USPC .................................................. 707/827, 649
See application file for complete search history.

(56) References Cited

U.S. PATENT DOCUMENTS

| | | | |
|---|---|---|---|
| 8,396,895 B2* | 3/2013 | Miloushev | G06F 16/1824 |
| | | | 707/795 |
| 9,535,844 B1* | 1/2017 | Cooney | G06F 3/06 |
| 11,182,291 B2* | 11/2021 | Gupta | G06F 3/0679 |
| 2002/0161855 A1* | 10/2002 | Manczak | G06F 16/183 |
| | | | 709/219 |
| 2012/0131265 A1* | 5/2012 | Koltsidas | G06F 12/0868 |
| | | | 711/E12.024 |

(Continued)

OTHER PUBLICATIONS

J. Crook, "The Differences Between Cold, Warm, and Hot Storage," https://www.ctera.com/company/blog/differences-hot-warm-cold-file-storage/, Accessed Jun. 2, 2021, 8 pages.

(Continued)

*Primary Examiner* — Shahid A Alam
(74) *Attorney, Agent, or Firm* — Ryan, Mason & Lewis, LLP

(57) ABSTRACT

A method comprises receiving a request to configure a temporary cache associated with at least one storage array and configuring the temporary cache in response to the request. In the method, the temporary cache is exposed to a tiering software portion of a tiering appliance for a designated time period, and a portion of data from one or more cloud storage platforms is stored in the temporary cache. The method also includes retrieving the portion of the data from the temporary cache in response to one or more read requests from one or more user devices, and removing the temporary cache in response to expiration of the designated time period.

20 Claims, 8 Drawing Sheets

(56) References Cited

U.S. PATENT DOCUMENTS

| | | | |
|---|---|---|---|
| 2013/0282662 A1* | 10/2013 | Kumarasamy | G06F 16/27 707/649 |
| 2020/0250149 A1 | 8/2020 | Bono et al. | |
| 2020/0387448 A1* | 12/2020 | Thomasson | G06F 3/0604 |

OTHER PUBLICATIONS

Dell EMC, "Dell Emc Unity: Cloud Tiering Appliance (CTA) A Detailed Review," White Paper, Mar. 2019, 32 pages.

* cited by examiner

```
asdf@123aaa456bbb:/src# tail -f callback.log
17-Nov-20 18:38:57 botocore.credentials INFO Found credentials in shared credentials
file: ~/.aws/credentials 17-Nov-20 18:43:32 CLOUD INFO Object file1.txt read from CLOUD
17-Nov-20 18:43:32 CLOUD_CALLBACK INFO Object added to cache file1.txt
17-Nov-20 18:43:32 DB_HELPER INFO Inserted new OID file1.txt in database 17-Nov-20 18:44:01 CLOUD INFO Object file3.txt read from CLOUD
17-Nov-20 18:44:01 CLOUD_CALLBACK INFO Object added to cache file3.txt
17-Nov-20 18:44:01 DB_HELPER INFO Inserted new OID file3.txt in database 17-Nov-20 18:44:11 CLOUD INFO Object file2.txt read from CLOUD
17-Nov-20 18:44:11 CLOUD_CALLBACK INFO Object added to cache file2.txt
17-Nov-20 18:44:11 DB_HELPER INFO Inserted new OID file2.txt in database
17-Nov-20 18:44:11 CLOUD_CALLBACK INFO Object file1.txt found in cache
17-Nov-20 18:44:11 DB_HELPER INFO Access time updated for file id:1

17-Nov-20 18:44:31 DB_HELPER INFO Cache full, running LRU file eviction algorithm
17-Nov-20 18:44:31 DB_HELPER INFO Current space utilized: 112640000.0 bytes.
Total space available: 112640000 bytes
17-Nov-20 18:44:31 DB_HELPER INFO Current space utilized: 81920000.0 bytes.
Total space available: 112640000 bytes
17-Nov-20 18:44:31 DB_HELPER INFO Evicted object ids: ['file3.txt', 'file2.txt']

17-Nov-20 18:44:41 CLOUD INFO Object file4.txt read from CLOUD
17-Nov-20 18:44:41 CLOUD_CALLBACK INFO Object added to cache file4.txt
17-Nov-20 18:44:41 DB_HELPER INFO Inserted new OID file4.txt in database
```

FIG. 5

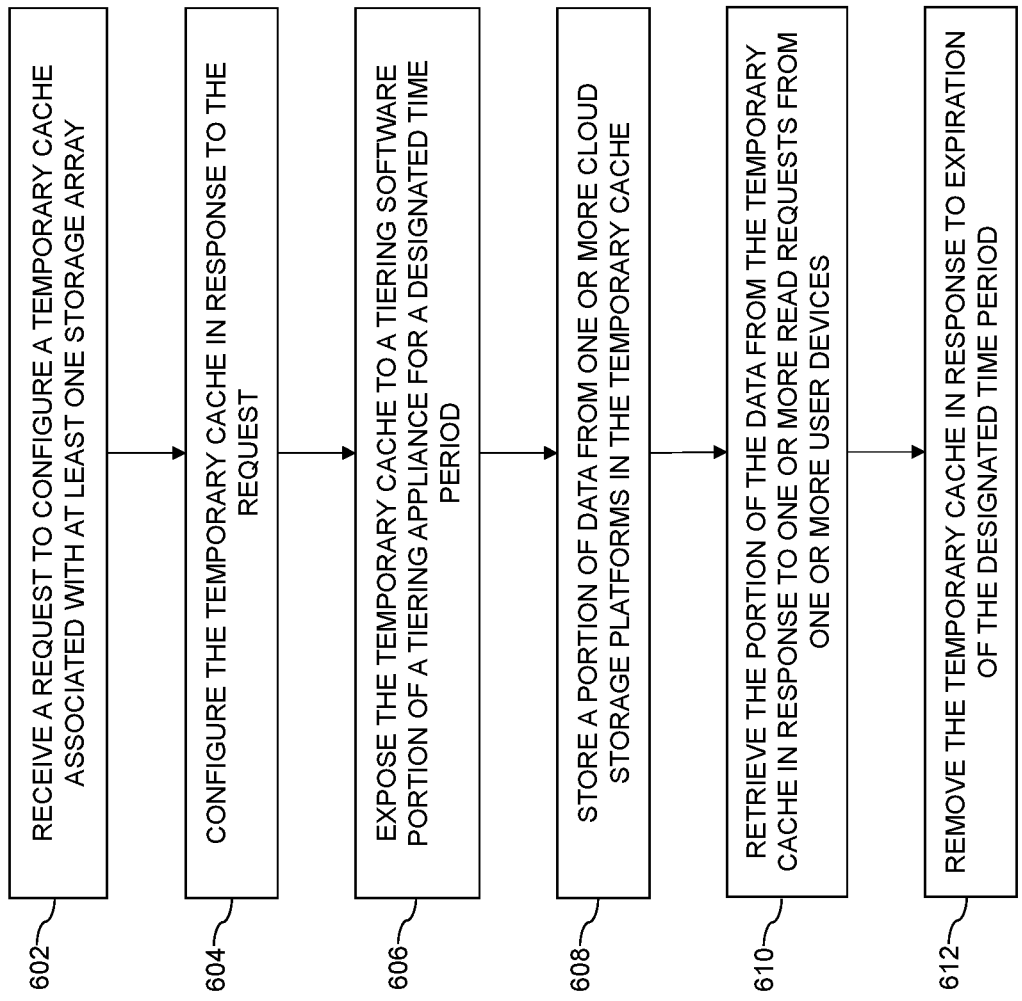

TRANSIENT CACHING TO SUPPORT SHORT-TERM RECALL OF TIERED FILES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in information processing systems.

BACKGROUND

In data storage, hot files typically refer to frequently used and/or critical files generally stored in local storage for fast access. Cold files typically refer to files that are not frequently used and that do not require fast access. Cold files are generally archived and stored in, for example, low-cost object and cloud storage tiers.

Files stored in primary storage may become cold over a period of time and may be moved to cloud storage. However, there may be situations where users require access to at least a subset of the cold files for short periods of time. Given that the cold file subsets may only be temporarily required, a full recall of the cold files to a primary storage tier is undesirable.

SUMMARY

Illustrative embodiments provide techniques to utilize a temporary cache for short-term retrieval of data from a cloud storage platform.

In one embodiment, a method comprises receiving a request to configure a temporary cache associated with at least one storage array and configuring the temporary cache in response to the request. In the method, the temporary cache is exposed to a tiering software portion of a tiering appliance for a designated time period, and a portion of data from one or more cloud storage platforms is stored in the temporary cache. The method also includes retrieving the portion of the data from the temporary cache in response to one or more read requests from one or more user devices, and removing the temporary cache in response to expiration of the designated time period.

These and other illustrative embodiments include, without limitation, methods, apparatus, networks, systems and processor-readable storage media.

BRIEF DESCRIPTION OF THE DRAWINGS

FIG. 5 depicts a screenshot illustrating the addition and removal of files accessed from cloud storage to and from a temporary cache according to an illustrative embodiment.

FIG. 6 depicts a process for temporary cache creation and retrieval of files from cloud storage via a temporary cache according to an illustrative embodiment.

DETAILED DESCRIPTION

Figure 1:
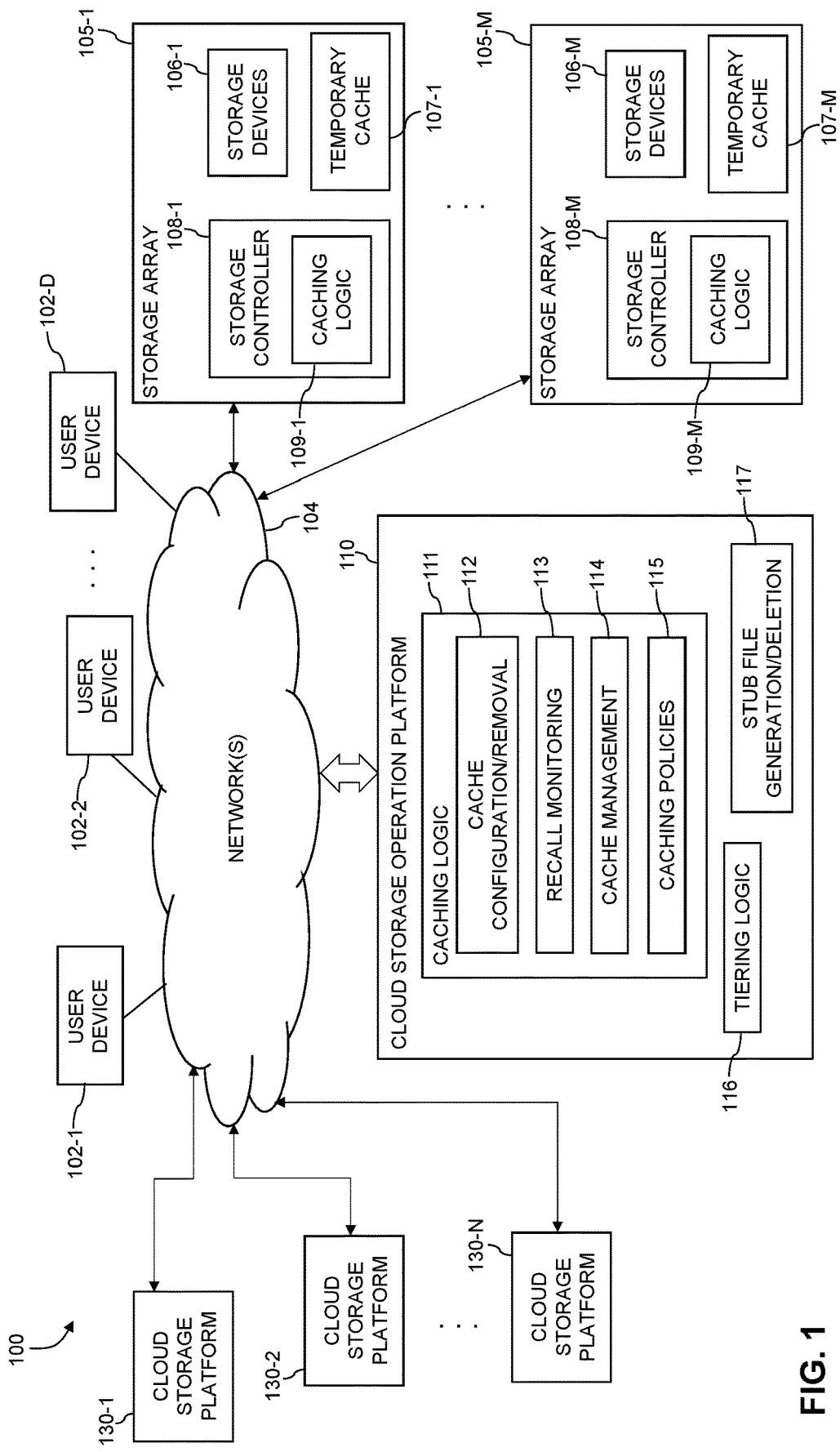
FIG. 1 depicts details of an information processing system with a cloud storage operation platform for managing retrieval of files from cloud storage via a temporary cache according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, a "stub file" refers to a file placed in an original file location on a storage device when the original file is archived to an archive location, such as, for example, a cloud storage platform. According to an embodiment, when a stub file is read in an input-output (TO) operation, the IO operation is passed through to the original file located in the archive location, and the original file may be presented to a user as if the original file were in its original location on the storage device. The stub file occupies less memory space ("size on disk") than the original file.

As used herein, "configure," "configuring" and/or "configuration" of a temporary cache is to be broadly construed to refer to, for example, allocating a portion of memory for the temporary cache, generating a virtual cache or generating a software-defined cache.

As used herein, "remove," "removing" and/or "removal" of a temporary cache is to be broadly construed to refer to, for example, clearing a portion of memory of the temporary cache and/or reallocating the portion memory to item(s) other than the temporary cache, deleting a virtual cache or deleting a software-defined cache.

As used herein, "short-term" is to be broadly construed to refer to, for example, a relatively short period of time in which recall of data may be necessary from cloud storage. In some non-limiting examples, short-term can refer to a limited number of hours or days (e.g., 12 hours, 2-3 days).

Users who have tiered files in primary and cloud storage may need to recall some of the files from a cloud storage platform for relatively short periods of time. Illustrative embodiments permit recall of a subset of files from cloud storage without requiring recall of an entire directory. The embodiments provide techniques for the configuration and utilization of a transient cache to recall the subset of the files from cloud storage. In one or more embodiments, the transient cache (also referred to herein as a "temporary cache") is exposed to at least a portion of a tiering appliance (e.g., cloud tiering appliance (CTA)) for a limited time period in which to retrieve the files. Once the time period expires, the temporary cache is removed and masked from the tiering appliance.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a cloud storage operation platform 110. A non-limiting example of a cloud storage operation platform 110 comprises a CTA, but the embodiments are not necessarily limited thereto. The user devices 102 may also communicate over the network 104 with a plurality of storage arrays 105-1, . . . 105-M, collectively referred to herein as storage arrays 105. The storage arrays 105 comprise respective sets of storage devices 106-1, . . . 106-M, collectively referred to herein as storage devices 106, coupled to respective storage controllers 108-1, . . . 108-M, collectively referred to herein as storage controllers 108. Each of the storage controllers 108 comprise respective instances of caching logic 109-1, . . . 109-M, collectively referred to herein as caching logic 109, described in more detail herein. In addition, as described further herein, temporary caches 107-1, . . . , 107-M, collectively referred to herein as temporary caches 107 may be periodically added to and removed from the storage arrays 106.

The user devices 102 can comprise, for example, Internet of Things (IoT) devices, desktop, laptop or tablet computers, mobile telephones, or other types of processing devices capable of communicating with the cloud storage operation platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, M, N and P are assumed to be arbitrary positive integers greater than or equal to two.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the cloud storage operation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cloud storage operation platform 110, as well as to support communication between the cloud storage operation platform 110 and connected devices (e.g., user devices 102) and/or other related systems and devices not explicitly shown.

Users may refer to customers, clients and/or administrators of computing environments for which temporary cache creation and file retrieval from temporary caches are being performed. For example, in some embodiments, the user devices 102 are assumed to be associated with repair technicians, system administrators, information technology (IT) managers, software developers release management personnel or other authorized personnel configured to access and utilize the cloud storage operation platform 110.

The cloud storage operation platform 110 of the system 100 is configured to move data between the storage arrays 105 and one or more cloud storage platforms 130-1, 130-2, . . . 130-N, collectively referred to herein as cloud storage platforms 130. The cloud storage operation platform 110 is also configured to move data from one of the storage arrays 105 to another one of the storage arrays 105, from one of the user devices 102 to another one of the user devices 102, between the user devices 102 and one or more storage arrays 105 or one or more cloud storage platforms 130 and between different locations (e.g., directories) within the same storage array 105 or within the same user device 102.

The cloud storage operation platform 110 is configured to move data, for example, by moving snapshots, data files or other data objects in and between the user devices 102, the storage arrays 105 and the cloud storage platforms 130. A given data object may comprise a single data file, or multiple data files. According to one or more embodiments, the cloud storage operation platform 110 permits administrators to automatically move data in and between the user devices 102, the storage arrays 105 and the cloud storage platforms 130 based on user-configured policies. The cloud storage platforms 130 include, for example, Dell® EMC® Elastic Cloud Storage (ECS), Microsoft® Azure®, Amazon® S3, and/or IBM® Cloud Object Storage (COS) platforms, or other available cloud infrastructures.

The cloud storage operation platform 110 in the present embodiment is assumed to be accessible to the user devices 102, and vice-versa, over the network 104. In addition, the cloud storage operation platform 110 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the cloud storage operation platform 110 comprises caching logic 111, tiering logic 116 and a stub file generation/deletion component 117. The caching logic 111 comprises a cache configuration/removal component 112, a recall monitoring component 113, a cache management component 114 and a caching policies component 115. The cloud storage operation platform 110, on behalf of respective infrastructure tenants each corresponding to one or more users associated with respective ones of the user devices 102, provides a platform for utilizing temporary caches 107 to retrieve files from cloud storage platforms 130. In one or more embodiments, the temporary caches 107 exist in the storage arrays 105 and are exposed to a tiering software portion (e.g., tiering logic 116) of the cloud storage operation platform 110. In one or more embodiments, the tiering logic 116 comprises at least one container, such as, for example, a tiering appliance container including packaged code and its dependencies for executing file tiering and retrieval across multiple computing environments. The temporary caches 107 are available for relatively short periods of time, after which the temporary caches 107 are masked from the tiering logic 116 of the cloud storage operation platform 110 and/or removed.

The cloud storage operation platform 110 in some embodiments comprises configurable data mover modules adapted to interact with the user devices 102, the storage arrays 105 and the cloud storage platforms 130. At least one configuration file is implemented in or otherwise associated with the cloud storage operation platform 110. The state of the configuration file may be controlled at least in part by a job scheduler implemented as part of the cloud storage operation platform 110. The job scheduler interacts with the caching logic 111 and/or the tiering logic 116.

The cloud storage operation platform 110 can include at least one application programming interface (API) that permits an external component to control selection between various modes of operation. For example, the above-noted job scheduler can access the configuration file via such an API in order to control a mode of operation of the cloud storage operation platform 110. Additionally or alternatively, an application running on one or more of the user devices 102 can access the configuration file via the API in order to control the mode of operation of the cloud storage operation platform 110.

In some embodiments, the cloud storage operation platform 110 is configurable via the configuration file in a mode of operation in which a particular type of data movement in and between user devices 102, the storage arrays 105 and the cloud storage platforms 130 occurs for a given data object being utilized by an application running on one or more of the user devices 102. Furthermore, other embodiments can configure the cloud storage operation platform 110 in different modes of operation without the use of a configuration file. Thus, such a configuration file should not be viewed as a requirement.

The cloud storage operation platform 110 is illustratively coupled to the network 104 and configured to control transfer of data in and between the user devices 102, the storage arrays 105 and the cloud storage platforms 130. The term "data movement" as used in this and other contexts herein is intended to be broadly construed, so as to encompass data migration as well as other types of movement of data and relocation in and between the user devices 102, the storage arrays 105 and the cloud storage platforms 130. A given data mover module can be implemented at least in part on storage arrays 105 or other storage platforms that implement at least portions of one or more storage tiers of the multi-tier storage system.

In one or more embodiments, the cloud storage operation platform 110, and more particularly, the tiering logic 116, can be used to tier file data and archive block data to the cloud storage platforms 130, and to recall file data and restore block data to the storage arrays 105 from the cloud storage platforms 130. In some embodiments, the cloud storage operation platform 110 can be used to migrate repositories between cloud storage platforms 130, storage arrays 105 and/or user devices 102.

In a file tiering process (also referred to herein as "cloud tiering") or file archiving process, the tiering logic 116 is configured to identify files that fit a criteria, (e.g., an administrator-defined criteria), and the cloud storage operation platform 110 initiates movement of the identified files to a cloud storage platform 130. The stub file generation/deletion component 117 creates a stub file in the original file location on, for example, the storage array 105 or the user device 102. According to an embodiment, when the stub file is read, the cloud storage operation platform 110 recalls or passes an IO operation through to the original file located in the cloud storage platform 130, and the original file may be presented to a user as if the original file were in its original location on the storage array 105 or user device 102.

As noted herein above, there may be a need to have tiered files recalled from a cloud storage platform for relatively short periods of time. Illustrative embodiments permit recall of a subset of files from one or more cloud storage platforms 130 without requiring recall of an entire directory. In a non-limiting operational example, an enterprise may perform an internal audit wherein the auditors might need read access to some cold data for a short period of time, but not all of the cold data. The cold data comprises data which has been archived to cloud storage. The embodiments provide techniques for the configuration and utilization of one or more temporary caches 107 for temporary storage of the recalled files so that they may be retrieved by users via one or more user devices 102. In one or more embodiments, a temporary cache 107 is exposed to at least the tiering logic portion 116 of the cloud storage operation platform 110 for a limited time period in which to retrieve the files. Once the time period expires, the temporary cache 107 is removed and masked from the cloud storage operation platform 110.

Figure 2:
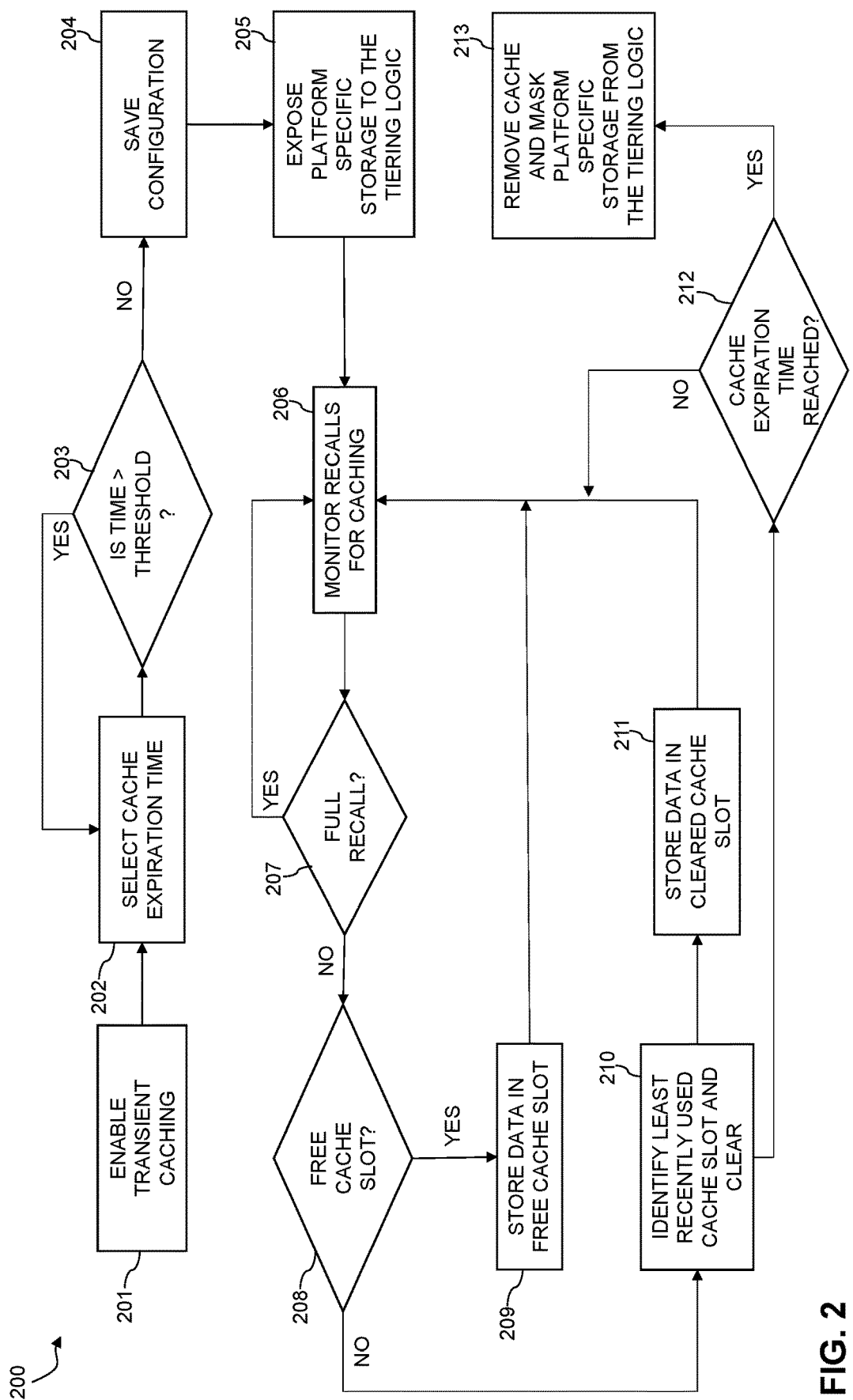
FIG. 2 depicts details of an operational flow for configuration of and storage of data in a temporary cache according to an illustrative embodiment.

Referring to the operational flow 200 for configuration of and storage of data in a temporary cache of FIG. 2, in the event a user determines there is a need for short-term access to a subset of files in a directory, at block 201, a user enables transient caching via some form of input on a user device 102 such as, for example, by clicking a checkbox on a user interface. In addition, referring to block 202, the user may specify or select a duration for the temporary cache 107 to exist and/or be available. In an illustrative embodiment, the caching policies component 115 of the caching logic 111 includes a specification of a maximum time that a temporary cache 107 is permitted to exist and/or be available. In some embodiments, the caching policies component 115 may also include a specification of a minimum time that a temporary cache 107 is permitted to exist and/or be available. At block 203, the cache configuration/removal component 112 compares the specified or selected cache duration to a threshold (e.g., the maximum time that the temporary cache is permitted to exist or be available). If the specified or selected duration exceeds the threshold (Yes at block 203), then the process returns to block 202, where another cache duration must be selected. If the specified or selected duration is less than the threshold (No at block 203), then the process proceeds to blocks 204 and 205, where the cache configuration/removal component 112 saves the cache configuration, configures the temporary cache 107, and exposes the cloud storage operation platform 110, and more particularly, the tiering logic 116, to the temporary cache 107. As seen in FIG. 1, the temporary caches 107 are configured in the storage arrays 105. Alternatively, the temporary caches 107 may be configured in a device or virtual machine (VM) external and accessible to the storage array 105 and accessible to the cloud storage operation platform 110. As explained further herein, the temporary caches 107 can comprise various types of storage devices, including, but not necessarily limited to, a non-volatile random-access memory (NVRAM) storage device and a serial advanced technology attachment (SATA) storage device. At block 206, the recall monitoring component 113 monitors recalls of files initiated via, for example, read requests from user devices 102, to determine whether the recalls are full recalls comprising, for example, an entire directory or other grouping of files, or partial recalls comprising a subset of a grouping of files (e.g., some, but not all of the files from a directory). At block 207, it is determined whether a retrieval of files from a cloud storage platform 130 comprises a full recall or a partial recall. If the read request corresponds to a full recall (Yes at block 207), the cache management component 114 determines that the files corresponding to the full recall are not to be added to the temporary cache 107, and instead the grouping of files (e.g., entire directory) is completely rehydrated at a storage device 106 from the cloud storage platform 130. In other words, the files corresponding to the full recall are restored on one or more of the storage devices 106 and monitoring of recalls for caching continues at block 206. In the case of the full recall, the files corresponding to a full recall of the files from the one or more cloud storage platforms 130 are omitted from storage in the temporary cache and the files are moved back to a storage array 105. Further access to a cloud storage platform 130 to retrieve these files is not needed at least until the grouping of files is re-archived (re-tiered) to the cloud storage platform 130.

Alternatively, if at block 207 it is determined that a recall comprises a partial recall of a subset of a grouping of files (e.g., less than all of the files in a directory or other grouping) (No at block 207), the cache management component 114 determines whether there is free storage space (e.g., a free cache slot or other available memory) in the temporary cache 107 (block 208). If there is available storage space in the temporary cache 107 (Yes at block 208), the process proceeds to block 209 where the cache management component 114 stores the subset of files corresponding to the partial recall in the available storage space (e.g., free cache slot) of the temporary cache 107. In this case, the files corresponding to the partial recall remain in the cloud storage platform 130 and copies of the files are temporarily stored in the temporary cache 107 so that they can be accessed for a limited duration by a user via, for example, one of the user devices 102. In the case of a partial recall, one or more previously existing stub files corresponding to the partially recalled files stored in the temporary cache 107, which were created in a storage array 106 in response to the original archiving of the files to cloud storage, remain in the storage array following the storing of the partially recalled files in the temporary cache 107. In this way, once the temporary cache 107 is removed, the remaining stub files can be used to access those files that were partially recalled from cloud storage.

Referring back to block 208, if the cache management component 114 determines that there is no free space in the temporary cache 107 to store the partially recalled files (No at block 208), the process proceeds to block 210, where the cache management component 114 identifies a least recently used (LRU) portion (e.g., LRU cache slot or other memory portion) of the temporary cache 107, and clears the LRU portion of the temporary cache 107 by removing the data from the LRU portion. An LRU portion refers to portion of the cache that has not been used (e.g., accessed) for the longest amount of time. At block 211, the partially recalled files are stored in the cleared LRU portion. In determining whether there is free memory in the temporary cache 107, the cache management component 114 identifies and compares a size of the partially recalled files to the free memory to determine whether the free memory has adequate capacity to store the partially recalled files. Similarly, when selecting one or more LRU portions to clear from the temporary cache 107, the cache management component 114 determines whether the LRU portions have adequate capacity to store the partially recalled files. In some cases where the capacity of a single LRU portion is not sufficient to store the partially recalled files, the cache management component 114 may select additional and/or different LRU portions until the total capacity of one or more LRU portions is sufficient to store the partially recalled files.

Referring to the screenshot 500 in FIG. 5, files accessed from a cloud storage platform 130 can be added to a temporary cache 107 and removed from the temporary cache 107 to make room for other files. For example, file.1.txt, file.3.txt and file.2.txt from cloud storage are added to a temporary cache 107. Then, when the cache 107 is full, file.1.txt and file.3.txt (e.g., LRU files) are removed from the temporary cache 107 so that file.4.txt can be added to the temporary cache 107.

Referring to block 212 in FIG. 2, the cache configuration/removal component 112 determines whether the designated time for the existence and/or availability of the temporary cache 107 has expired. If no at block 212, the process continues at block 206, where recalls are monitored to determine whether files should be cached. If yes at block 212, the process proceeds to block 213, where the cache configuration/removal component 112 removes the temporary cache 107 from the corresponding storage array 105 in which it is located, or from another location where the temporary cache was configured. In some embodiments, as shown in block 213, a temporary cache 107 is also masked from the tiering software portion (e.g., tiering logic 116) of the cloud storage operation platform 110. For example, the temporary cache 107 can be masked from the tiering logic 116 prior to or instead of removing the temporary cache 107. In one or more embodiments, the temporary cache 107 can be masked from the tiering logic 116, cleared and then re-used when transient caching is selected again at block 201.

The caching logic 111 is discussed as being part of a cloud storage operation platform 110 comprising, for example a CTA. As noted herein above, the storage controllers 108 include respective instances of caching logic 109. In one or more embodiments, the respective instances of the caching logic 109 in the storage controllers 108 have the same components 112-115 as the caching logic 111 and are configured to perform the same functions as described in connection with the caching logic 111. The instances of the caching logic 109 can operate independent of the caching logic 111 and/or operate in conjunction with the caching logic 111 to perform the same functions as the caching logic 111 as described herein. For example, like the caching logic 111, the caching logic 109 configures temporary caches 107, exposes the temporary caches 107 to a tiering software portion (e.g., tiering logic 116) of a cloud storage operation platform 110, monitors file recall from cloud storage platforms 130, manage storage of files from cloud storage platforms 130 in the temporary caches 107, manages retrieval of the stored files from the temporary caches 107 and masks and/or removes the temporary caches 107 upon expiration of the designated time periods for existence of the temporary caches 107 as described herein.

Figure 3:
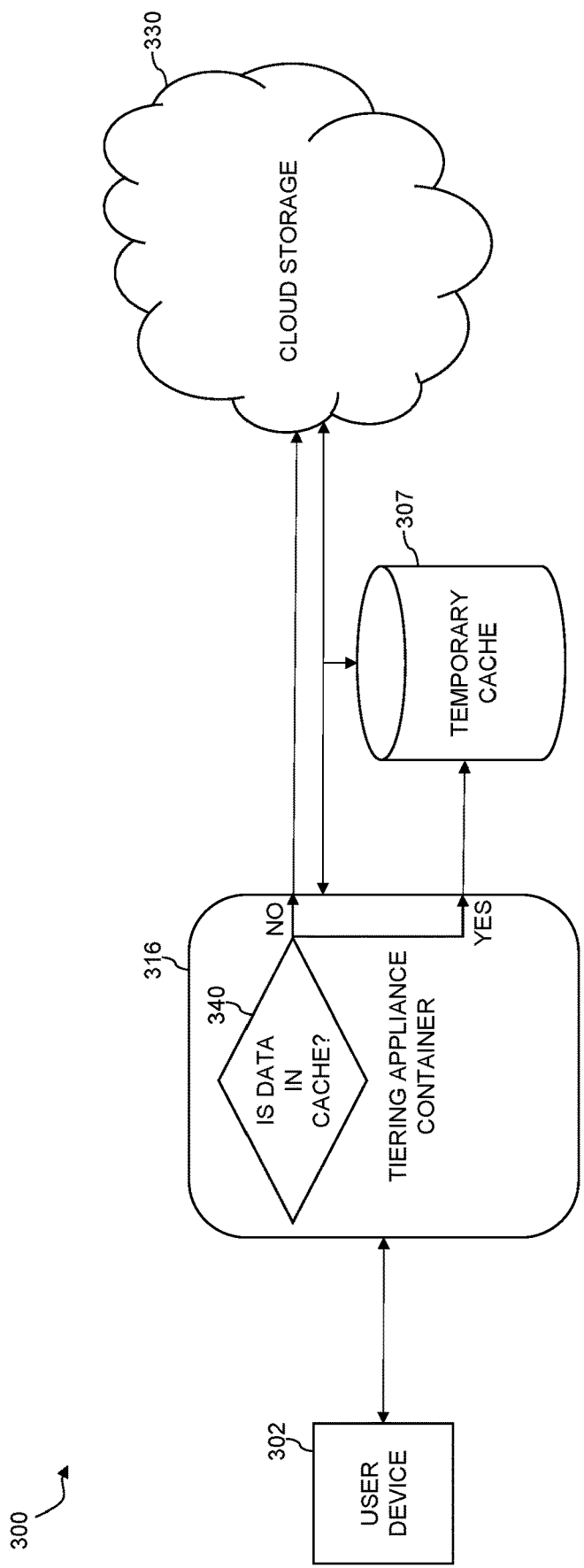
FIG. 3 depicts details of an operational flow for retrieval of files from cloud storage via a temporary cache according to an illustrative embodiment.

Referring to the operational flow 300 in FIG. 3, a temporary cache 307 is exposed to a tiering appliance container 316. As described herein, caching logic (e.g., caching logic 109 and/or 111) comprises a mechanism by which it can tell a storage array when to expose the temporary cache 307 to the container 316, and when to mask (e.g., hide) the temporary cache 307 from the container 316. On receiving a read request from a user device 302 (which is the same or similar to a user device 102) for data, if the data is in the cache 307 (Yes at block 340), the tiering appliance container 316 retrieves file(s) corresponding to the requested data from the exposed temporary cache 307 and provides the data to a user via the user device 302. If the requested data is not in the temporary cache 307 (No at block 340), the tiering appliance container 316, in conjunction with the caching logic, retrieves the file(s) corresponding to the requested data from cloud storage 330 (e.g., a public cloud) and adds the files to the temporary cache 307 so that the added files can be provided to a user via the user device 302.

Figure 4:
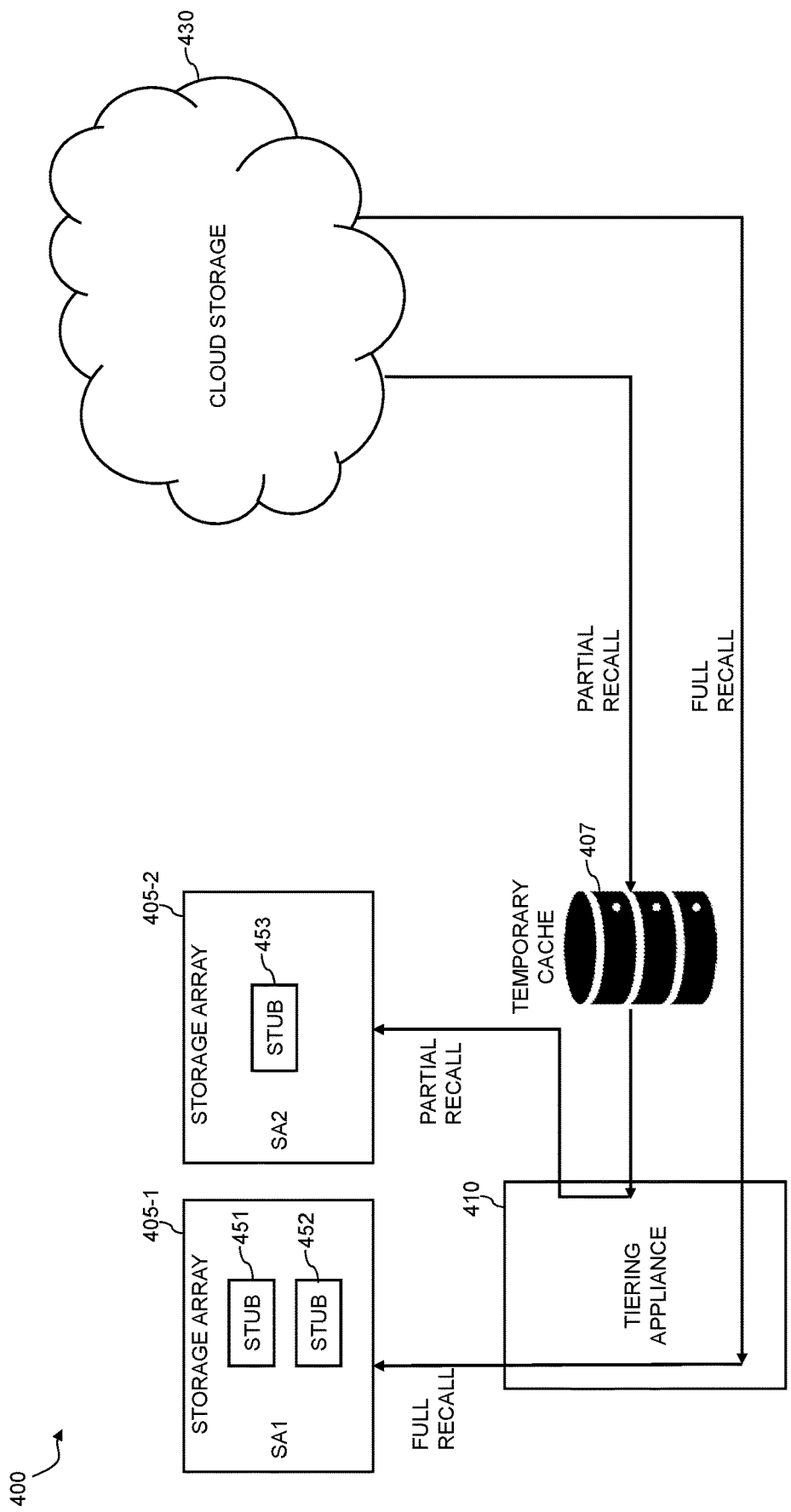
FIG. 4 depicts details of an operational flow for full and partial recall of files from cloud storage according to an illustrative embodiment.

Referring to the operational flow 400 in FIG. 4, a tiering appliance 410 (e.g., cloud tiering appliance) manages the handling of data in a temporary cache 407 and executes full recalls of data comprising, for example, entire directories or other groupings of files, or partial recalls comprising subsets of a grouping of files based on a read request. As can be seen in FIG. 4 and as described herein above, files corresponding to full recalls are not added to the temporary cache 407, and instead are rehydrated in a storage array 405-1 (SA1) from a cloud storage platform 430. As can be seen in FIG. 4 and as described herein above, files corresponding to partial recalls are added to the temporary cache 407 corresponding to the storage array 405-2 (SA2). The storage arrays 405-1 and 405-2 comprise one or more stub files 451, 452 and 453. As noted herein, in the case of partially recalled files in a temporary cache (e.g., temporary cache 407) an original stub file (e.g., stub file 453) remains untouched, and a storage administrator need not run new policies to tier the data corresponding to the partially recalled files back to a cloud storage platform 430. In the case of fully recalled files rehydrated in a storage array 405-1 (SA1), stub files 451 and 452 are no longer valid and need to be regenerated once the data corresponding to the fully recalled files is tiered back to the cloud storage platform 430.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cloud storage operation platform 110, caching logic 111, tiering logic 116 and the stub file generation/deletion component 117 in other embodiments can be implemented at least in part externally to the cloud storage operation platform 110, for example, as stand-alone servers, sets of servers or other types of systems coupled to the network 104. For example, the caching logic 111, the tiering logic 116 and the stub file generation/deletion component 117 may be provided as cloud services accessible by the cloud storage operation platform 110.

The caching logic 111, tiering logic 116 and stub file generation/deletion component 117 in the FIG. 1 embodiment are each assumed to be implemented using at least one processing device. Each such processing device generally comprises at least one processor and an associated memory, and implements one or more functional modules for controlling certain features of the caching logic 111, tiering logic 116 and/or stub file generation/deletion component 117.

At least portions of the cloud storage operation platform 110 and the components thereof may be implemented at least in part in the form of software that is stored in memory and executed by a processor. The cloud storage operation platform 110 and the components thereof comprise further hardware and software required for running the cloud storage operation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the caching logic 111, tiering logic 116, stub file generation/deletion component 117 and other components of the cloud storage operation platform 110 in the present embodiment are shown as part of the cloud storage operation platform 110, at least a portion of the caching logic 111, tiering logic 116, stub file generation/deletion component 117 and other components of the cloud storage operation platform 110 in other embodiments may be implemented on one or more other processing platforms that are accessible to the cloud storage operation platform 110 over one or more networks. Such components can each be implemented at least in part within another system element or at least in part utilizing one or more stand-alone components coupled to the network 104.

It is assumed that the cloud storage operation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the caching logic 111, tiering logic 116, stub file generation/deletion component 117 and other components of the cloud storage operation platform 110, and the elements thereof can each be implemented in the form of one or more LXCs running on one or more VMs. Other arrangements of one or more processing devices of a processing platform can be used to implement the caching logic 111, tiering logic 116 and stub file generation/deletion component 117 as well as other components of the cloud storage operation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the cloud storage operation platform 110 to reside in different data centers. Numerous other distributed implementations of the cloud storage operation platform 110 are possible.

Accordingly, one or each of the caching logic 111, tiering logic 116, stub file generation/deletion component 117 and other components of the cloud storage operation platform 110 can each be implemented in a distributed manner so as to comprise a plurality of distributed components implemented on respective ones of a plurality of compute nodes of the cloud storage operation platform 110.

It is to be appreciated that these and other features of illustrative embodiments are presented by way of example only, and should not be construed as limiting in any way.

Accordingly, different numbers, types and arrangements of system components such as the caching logic 111, tiering logic 116, stub file generation/deletion component 117 and other components of the cloud storage operation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the cloud storage operation platform can be offered to cloud infrastructure customers or other users as part of FaaS, CaaS and/or PaaS offerings.

The operation of the information processing system 100 will now be described in further detail with reference to the flow diagram of FIG. 6. With reference to FIG. 6, a process 600 for temporary cache creation and retrieval of files from cloud storage via a temporary cache as shown includes steps 602 through 612, and is suitable for use in the system 100 but is more generally applicable to other types of information processing systems comprising a cloud storage operation platform configured for temporary cache creation and retrieval of files from cloud storage via a temporary cache.

In step 602, a request to configure a temporary cache associated with at least one storage array is received. In step 604, the temporary cache is configured in response to the request. In non-limiting illustrative embodiments, the temporary cache comprises an NVRAM storage device and/or a SATA storage device.

In step 606, the temporary cache is exposed to a tiering software portion of a tiering appliance for a designated time period. The request to configure the temporary cache comprises an identification of a duration of the designated time period. In one or more embodiments, the process further includes determining whether the duration of the designated time period exceeds a threshold. The tiering software portion comprises, for example, at least one container.

In steps 608 and 610, a portion of data from one or more cloud storage platforms is stored in the temporary cache, and the portion of the data is retrieved from the temporary cache in response to one or more read requests from one or more user devices.

The storing comprises identifying at least one read request for a partial recall of a plurality of files from the one or more cloud storage platforms to the at least one storage array, identifying the partially recalled files of the plurality of files, and storing the partially recalled files in the temporary cache. The storing further comprises identifying free storage space in the temporary cache, and storing the portion of the data from the one or more cloud storage platforms in the free storage space. The storing may also comprise determining that free storage space in the temporary cache is unavailable, identifying an LRU portion of the temporary cache, clearing the LRU portion of the temporary cache, and storing the portion of the data from the one or more cloud storage platforms in the cleared LRU portion of the temporary cache.

In step 612, the temporary cache is removed in response to expiration of the designated time period. The temporary cache is masked from the tiering software portion in response to expiration of the designated time period.

The process further includes identifying at least one read request for a full recall of a plurality of files from the one or more cloud storage platforms to the at least one storage array, and writing the plurality of files to the at least one storage array without adding the plurality of files to the temporary cache. Files corresponding to a full recall of the files from the one or more cloud storage platforms to the at least one storage array are omitted from storage in the temporary cache.

One or more stub files corresponding to the portion of the data stored in the temporary cache which were in the at least storage array prior to the storing of the portion of the data in the temporary cache, remain in the at least storage array following the storing of the portion of the data in the temporary cache.

According to an embodiment, the process includes determining that at least one read request from the one or more user devices corresponds to an additional portion of the data from the one or more cloud storage platforms that is not present in the temporary cache, and storing the additional portion of the data in the temporary cache. The additional portion of the data is retrieved from the temporary cache in response to the at least one read request.

It is to be appreciated that the FIG. 6 process and other features and functionality described above can be adapted for use with other types of information systems configured to execute temporary cache management services in a cloud storage operation platform or other type of platform.

The particular processing operations and other system functionality described in conjunction with the flow diagram of FIG. 6 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cloud storage operation platform as disclosed herein can provide a number of significant advantages relative to conventional arrangements. For example, unlike conventional techniques, the embodiments advantageously increase the speed of read operations and reduce the number of reads from cloud storage. In addition, the provision of a temporary cache for a tiering appliance results in minimal cost and uses minimal computing resources.

Unlike conventional approaches, where data is read from cloud storage by a tiering appliance through a passthrough mechanism and data reads are from cloud storage are relatively slow, the embodiments provide a temporarily available cache to store required cold data that may be needed for short periods of time. Advantageously, the embodiments improve data read time, and the use of a temporary cache prevents cloud storage from being used as primary storage.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the cloud storage operation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cloud storage operation platform in illustrative embodiments. These and other cloud-based systems in illustrative embodiments can include object stores.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
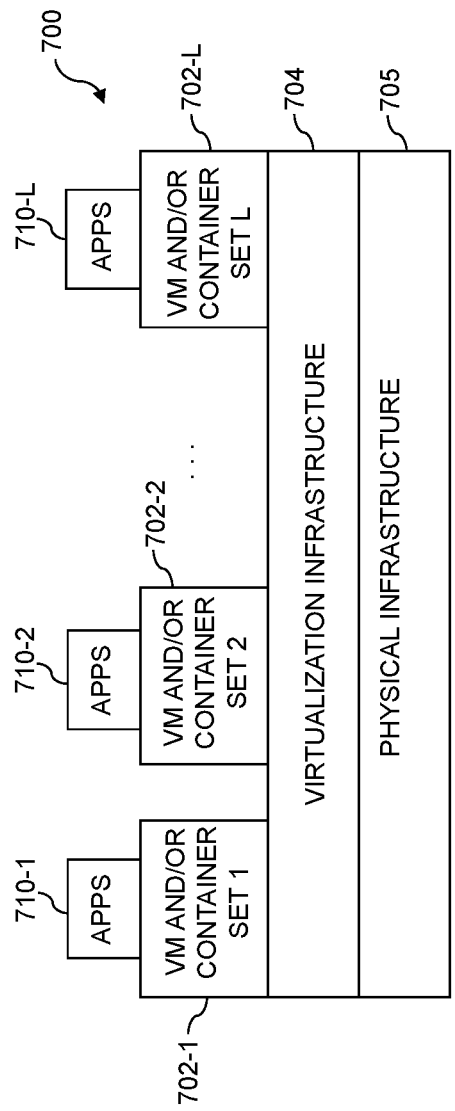
FIGS. 7 and 8 show examples of processing platforms that may be utilized to implement at least a portion of an information processing system according to illustrative embodiments.
Figure 8:
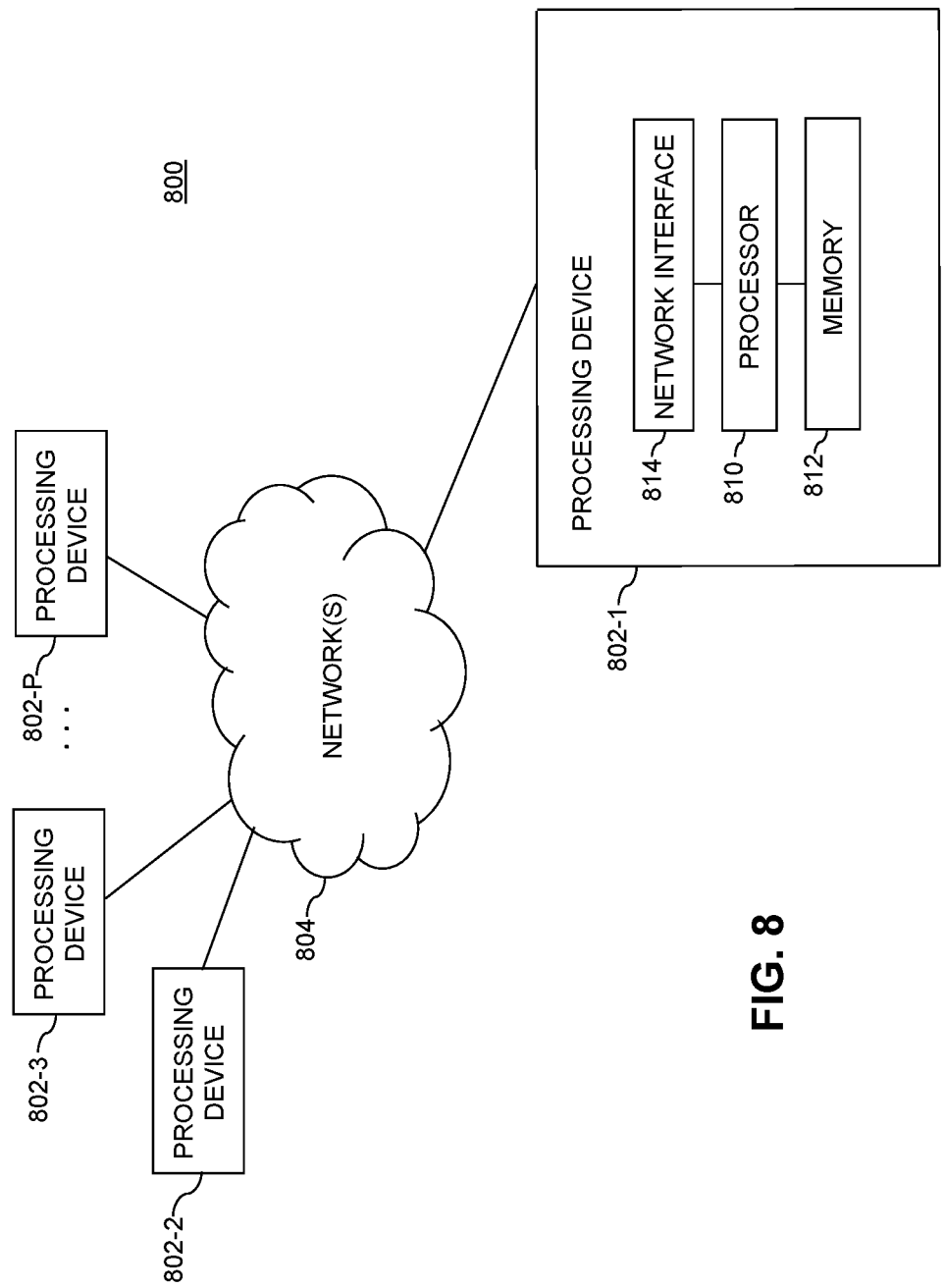

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, ... 802-P, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the cloud storage operation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cloud storage operation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to receive a request to configure a temporary cache associated with at least one storage array;
to configure the temporary cache in response to the request;
to expose the temporary cache to a tiering software portion of a tiering appliance for a designated time period;
to store a copy of a portion of data from one or more cloud storage platforms in the temporary cache while maintaining the portion of the data in the one or more cloud storage platforms and maintaining one or more stub files in the at least one storage array, the one or more stub files corresponding to the portion of the data in the one or more cloud storage platforms, wherein the one or more stub files are configured to be used for accessing the portion of the data from the one or more cloud storage platforms;
to retrieve the copy of the portion of the data from the temporary cache in response to one or more read requests from one or more user devices; and
to remove the temporary cache in response to expiration of the designated time period.

2. The apparatus of claim 1 wherein said at least one processing platform is further configured:
to mask the temporary cache from the tiering software portion in response to expiration of the designated time period.

3. The apparatus of claim 1 wherein:
the request to configure the temporary cache comprises an identification of a duration of the designated time period; and
said at least one processing platform is further configured to determine whether the duration of the designated time period exceeds a threshold.

4. The apparatus of claim 1 wherein said at least one processing platform is further configured:
to identify at least one read request for a full recall of a plurality of files from the one or more cloud storage platforms to the at least one storage array; and
to write the plurality of files to the at least one storage array without adding the plurality of files to the temporary cache.

5. The apparatus of claim 1 wherein said at least one processing platform is further configured to omit from storage in the temporary cache files corresponding to a full recall of the files from the one or more cloud storage platforms to the at least one storage array.

6. The apparatus of claim 1 wherein, in storing the copy of the portion of data from the one or more cloud storage platforms in the temporary cache, said at least one processing platform is configured:
to identify at least one read request for a partial recall of a plurality of files from the one or more cloud storage platforms to the at least one storage array;
to identify the partially recalled files of the plurality of files; and
to store a copy of the partially recalled files in the temporary cache.

7. The apparatus of claim 1 wherein, in storing the copy of the portion of data from the one or more cloud storage platforms in the temporary cache, said at least one processing platform is configured:
to identify free storage space in the temporary cache; and
to store the copy of the portion of the data from the one or more cloud storage platforms in the free storage space.

8. The apparatus of claim 1 wherein, in storing the copy of the portion of data from the one or more cloud storage platforms in the temporary cache, said at least one processing platform is configured:
to determine that free storage space in the temporary cache is unavailable;
to identify a least recently used portion of the temporary cache;
to clear the least recently used portion of the temporary cache; and
to store the copy of the portion of the data from the one or more cloud storage platforms in the cleared least recently used portion of the temporary cache.

9. The apparatus of claim 1 wherein the temporary cache comprises at least one of a non-volatile random-access memory storage device and a serial advanced technology attachment storage device.

10. The apparatus of claim 1 wherein said at least one processing platform is further configured:
to determine that at least one read request from the one or more user devices corresponds to an additional portion of the data from the one or more cloud storage platforms that is not present in the temporary cache; and
to store a copy of the additional portion of the data in the temporary cache.

11. The apparatus of claim 10 wherein said at least one processing platform is further configured to retrieve the copy of the additional portion of the data from the temporary cache in response to the at least one read request.

12. The apparatus of claim 1, wherein the tiering software portion comprises at least one container.

13. The apparatus of claim 1 wherein said at least one processing platform comprises the tiering appliance.

14. A method comprising:
receiving a request to configure a temporary cache associated with at least one storage array;
configuring the temporary cache in response to the request;
exposing the temporary cache to a tiering software portion of a tiering appliance for a designated time period;
storing a copy of a portion of data from one or more cloud storage platforms in the temporary cache while maintaining the portion of the data in the one or more cloud storage platforms and maintaining one or more stub files in the at least one storage array, the one or more stub files corresponding to the portion of the data in the one or more cloud storage platforms, wherein the one or more stub files are configured to be used for accessing the portion of the data from the one or more cloud storage platforms;
retrieving the copy of the portion of the data from the temporary cache in response to one or more read requests from one or more user devices; and
removing the temporary cache in response to expiration of the designated time period;
wherein the method is performed by at least one processing platform comprising at least one processing device comprising a processor coupled to a memory.

15. The method of claim 14 further comprising omitting from storage in the temporary cache files corresponding to a full recall of the files from the one or more cloud storage platforms to the at least one storage array.

16. The method of claim 14 wherein storing the copy of the portion of data from the one or more cloud storage platforms in the temporary cache comprises:
identifying at least one read request for a partial recall of a plurality of files from the one or more cloud storage platforms to the at least one storage array;
identifying the partially recalled files of the plurality of files; and
storing a copy of the partially recalled files in the temporary cache.

17. A computer program product comprising a non-transitory processor-readable storage medium having stored therein program code of one or more software programs, wherein the program code when executed by at least one processing platform causes said at least one processing platform:
to receive a request to configure a temporary cache associated with at least one storage array;
to configure the temporary cache in response to the request;
to expose the temporary cache to a tiering software portion of a tiering appliance for a designated time period;
to store a copy of a portion of data from one or more cloud storage platforms in the temporary cache while maintaining the portion of the data in the one or more cloud storage platforms and maintaining one or more stub files in the at least one storage array, the one or more stub files corresponding to the portion of the data in the one or more cloud storage platforms, wherein the one or more stub files are configured to be used for accessing the portion of the data from the one or more cloud storage platforms;

to retrieve the copy of the portion of the data from the temporary cache in response to one or more read requests from one or more user devices; and to remove the temporary cache in response to expiration of the designated time period.

18. The computer program product according to claim 17 wherein the program code further causes said at least one processing platform to omit from storage in the temporary cache files corresponding to a full recall of the files from the one or more cloud storage platforms to the at least one storage array.

19. The computer program product according to claim 17 wherein, in storing the copy of the portion of data from the one or more cloud storage platforms in the temporary cache, the program code causes said at least one processing platform:

to identify at least one read request for a partial recall of a plurality of files from the one or more cloud storage platforms to the at least one storage array;

to identify the partially recalled files of the plurality of files; and to store a copy of the partially recalled files in the temporary cache.

20. The computer program product according to claim 17 wherein, in storing the copy of the portion of data from the one or more cloud storage platforms in the temporary cache, the program code causes said at least one processing platform:

to determine that free storage space in the temporary cache is unavailable;

to identify a least recently used portion of the temporary cache;

to clear the least recently used portion of the temporary cache; and to store the copy of the portion of the data from the one or more cloud storage platforms in the cleared least recently used portion of the temporary cache.

* * * * *